(12) United States Patent
Yao

(10) Patent No.: US 12,017,824 B2
(45) Date of Patent: Jun. 25, 2024

(54) CUP COVER AND THERMOS CUP

(71) Applicant: EVERICH AND TOMIC HOUSEWARES CO., LTD., HangZhou (CN)

(72) Inventor: Huajun Yao, HangZhou (CN)

(73) Assignee: EVERICH AND TOMIC HOUSEWARES CO., LTD., Zhejiang (CN)

(*) Notice: Subject to any disclaimer, the term of this patent is extended or adjusted under 35 U.S.C. 154(b) by 86 days.

(21) Appl. No.: 17/885,094

(22) Filed: Aug. 10, 2022

(65) Prior Publication Data
US 2023/0047143 A1 Feb. 16, 2023

(30) Foreign Application Priority Data
Aug. 11, 2021 (CN) .......................... 202110917093.4

(51) Int. Cl.
*B65D 47/08* (2006.01)
*A45F 3/18* (2006.01)
*B65D 51/24* (2006.01)

(52) U.S. Cl.
CPC ............ *B65D 47/0871* (2013.01); *A45F 3/18* (2013.01); *B65D 51/242* (2013.01)

(58) Field of Classification Search
CPC ..... B65D 47/0871; B65D 51/242; A45F 3/18; A47J 41/0011; A47G 19/2288
(Continued)

(56) References Cited

U.S. PATENT DOCUMENTS 8,622,229 B2 * 1/2014 Lane ...................... B65D 43/26
215/388
9,211,040 B2 * 12/2015 Lane ...................... A47J 47/02
(Continued)

FOREIGN PATENT DOCUMENTS

| CN | 112603139 A | * | 4/2021 | ............... A45F 3/16 |
| KR | 20130087435 A | * | 8/2013 | ............... A47J 41/02 |
| WO | WO-2014194552 A1 | * | 12/2014 | ......... A47G 19/2205 |

*Primary Examiner* — Nathan J Jenness
*Assistant Examiner* — Eric C Baldrighi
(74) *Attorney, Agent, or Firm* — MUNCY, GEISSLER, OLDS & LOWE, P.C.

(57) ABSTRACT

The present application belongs to the technical field of daily necessities, and in particular relates to a cup cover and a thermos cup. Aiming at the defect that the position of the front button of the existing bouncing type cup cover is fixed, the present application adopts the following technical solution: a cup cover, the cup cover including: a cover seat, a water outlet being formed in the cover seat; a flip cover assembly, the flip cover assembly including a flip cover, a button and an elastic member, the flip cover being capable of covering the water outlet, and a clamping structure being formed between the button and the water outlet; and a movable lock, the movable lock being movably provided on the cover seat, the movable lock moving between a locked position and an unlocked position, and the movable lock being provided with a blocking part. The cup cover provided by the present application has the following beneficial effects: the button flips with the flip cover and is not fixed, so it is not easy to touch the lip, does not affect the user's drinking, and will not bring potential health hazards caused by the contaminated button touching the lip; the movable lock can restricts the movement of the button.

7 Claims, 8 Drawing Sheets

(58) Field of Classification Search
USPC .......................................................... 215/44
See application file for complete search history.

(56) References Cited

U.S. PATENT DOCUMENTS

| | | | |
|---|---|---|---|
| 10,660,463 B2* | 5/2020 | Sims ...................... | B65D 55/02 |
| 11,066,217 B2* | 7/2021 | Pinelli .................... | B65D 53/02 |
| 2012/0111821 A1* | 5/2012 | Starr .................. | B65D 47/0871 |
| | | | 215/235 |
| 2019/0135502 A1* | 5/2019 | Tsai ................... | B65D 81/3841 |

* cited by examiner

CUP COVER AND THERMOS CUP

TECHNICAL FIELD

The present application belongs to the technical field of daily necessities, and in particular relates to a cup cover and a thermos cup.

BACKGROUND

The existing popular thermos cups, such as Thermos JNL series, mostly adopt a push button cover opening structure. By pressing the button, the button rotates a small angle along the vertical plane, the clamping block part at the upper end of the button is separated from the clamping groove of the flip cover, and the flip cover rotates and opens under the action of the torsion spring. At the same time, in order to prevent the cup cover from being accidentally touched and opened, a blocking part is formed on the flip cover, and a flip retaining ring is provided. When the retaining ring part is above the blocking part of the flip cover, the retaining ring is fit with the blocking part to prevent the flip cover from flipping.

The above-mentioned traditional bouncing type cup cover has the following disadvantages: 1) the position of the button is at the front and is fixed, which occupies part of the use space; when drinking water, the lip is easy to touch, which causes obstruction to a certain extent and affects the comfort; 2) the position of the button is at the front and is fixed, the finger must contact and press the button, dust or bacteria may remain on the button, and the lip may touch the button when drinking water, which causes potential health hazards; 3) when the temperature and pressure in the cup are high, after the button is pressed, the flip cover will open quickly under the influence of pressure, and the high-temperature air flow will spray out quickly, which easily causes harm to the user; 4) the front end of the traditional flip cover is fit with the button for closing by single-point engagement, and the single point stress is concentrated, which easily causes wear or material fatigue and affects the service life; 5) the movable lock flips up and down and it restricts the flip cover.

SUMMARY

Aiming at the defect that the position of the front button of the existing bouncing type cup cover is fixed, the present application provides a cup cover, a front button of which flips with the flip cover, thus overcoming the disadvantage caused by the reason that the position of the front button is fixed. The present application further provides a thermos cup with the cup cover.

In order to achieve the purpose, the present application adopts the following technical solution: a cup cover includes:
   a cover seat, a water outlet being formed in the cover seat;
   a flip cover assembly, the flip cover assembly including a flip cover hinged on the cover seat, a button provided on the flip cover and movable relative to the flip cover, and an elastic member acting on the button and making the button far away from the flip cover, the flip cover being capable of covering the water outlet, and a clamping structure being formed between the button and the water outlet; and
   a movable lock, the movable lock being movably provided on the cover seat, the movable lock moving between a locked position and an unlocked position, and the movable lock being provided with a blocking part;
   when the movable lock is in the locked position, the blocking part of the movable lock is on a moving path of the button, and the blocking part prevents the button from moving; when the movable lock is in the unlocked position, the blocking part of the movable lock is outside the moving path of the button, the button overcomes the elastic force of the elastic member and moves towards the flip cover when the button is pressed, the button is separated from the water outlet, and the button flips with the flip cover.

The button of the cup cover provided by the present application flips with the flip cover and is not fixed, so it is not easy to touch the lip, does not affect the user's drinking, and will not bring potential health hazards caused by the contaminated button touching the lip. It is provided with a movable lock and the movable lock restricts the movement of the button, which is different from the movable lock restricting the flip cover in the prior art.

As an improvement, the movable lock moves back and forth between the locked position and the unlocked position through horizontal rotation.

As an improvement, the movable lock includes a split ring part, the split ring part sleeves the water outlet, and there is friction force between the split ring part and the water outlet. The split ring part of the movable lock has certain elastic force. After the split ring part is opened, it tightly sleeves the water outlet to produce friction force with the water outlet, so that the split ring part can stop at the locked position or unlocked position without external force, and will not move easily.

As an improvement, the split ring part is provided with a deformation groove at a position adjacent to the blocking part. The deformation groove makes the movable lock more easily sleeve the water outlet. At the same time, by changing the deformation groove, the sleeving tightness between the split ring part and the water outlet can be adjusted, so that the friction force is more appropriate.

As an improvement, the movable lock extends outwards to form a toggle part. The toggle part makes the operation of the movable lock more convenient.

As an improvement, an angle limiting part and a height limiting part for limiting the split ring part are formed at the water outlet. The angle limiting part limits the horizontal rotation angle of the movable lock, and the height limiting part limits the displacement of the movable lock in the height direction.

As an improvement, the flip cover is provided with sliding grooves, the button is provided with a slider and the slider is fit with the sliding grooves.

As an improvement, an outer side of the water outlet extends to form a pair of clamping blocks, the slider is exposed to the sliding grooves, and the clamping blocks are fit with the slider and form the clamping structure. When the slider is at least partially located directly below the clamping blocks, the slider of the button is clamped with the clamping blocks of the cover seat.

As an improvement, each clamping block is provided with a guide surface fit with the slider, and the guide surface is high in front and low in back. When the flip cover is closed, the clamping blocks on the button contact the slider. Since the slider is provided with a guide surface, the button is subject to the force from the slider, the elastic member between the button and the flip cover is compressed, and the button slides towards the flip cover, so that the slider does not interfere with the clamping blocks and the slider can reach the lower part of the clamping blocks. When the slider reaches the lower part of the clamping blocks, the slider is no longer subject to the force from the clamping blocks. Under the action of the elastic member, the button slides away from the flip cover, and the slider of the button is clamped with the clamping blocks of the cover seat.

As an improvement, the button is provided with a U-shaped part to facilitate mounting to the flip cover.

As an improvement, the button is provided with two parallel first planes, and the slider extends from the first planes in opposite directions; the flip cover is provided with two parallel second planes, and the sliding grooves are provided in the second planes. The button is in good contact with the flip cover, which can reduce the impurities entering the internal part from the sliding grooves.

As an improvement, the elastic member is a compression spring, a spring mounting column is formed on the flip cover, the compression spring sleeves the spring mounting column, the button is provided with a butting plane, one end of the compression spring is butted against the butting plane, and an upper end of the button forms an anti-falling part for preventing the compression spring from falling out.

As an improvement, a torsion spring is provided between the flip cover and the cover seat, so that the flip cover can open automatically after the button is pressed.

As an improvement, the flip angle of the flip cover is about 180°, so as to minimize the impact on user's drinking.

As an improvement, the flip cover is provided with a first sealing ring; when the flip cover is tightly closed, the first sealing ring is compressed and hermetically connected with the water outlet.

As an improvement, the button extends to form a lower convex part, and the lower convex part is fit with the blocking part, so that the height of the blocking part can be relatively small and the compression spring can be prevented from interfering with the blocking part.

As an improvement, a U-shaped groove is formed in the flip cover, and the shape of the button is adapted to the U-shaped groove.

As an improvement, the cover seat is provided with a handle.

A thermos cup includes a cup body and a cup cover. The cup cover is the cup cover described above. A second sealing ring is provided between the cup body and the cup cover.

The cup cover provided by the present application has the following beneficial effects: the button flips with the flip cover and is not fixed, so it is not easy to touch the lip, does not affect the user's drinking, and will not bring potential health hazards caused by the contaminated button touching the lip. It is provided with a movable lock, the movable lock restricts the movement of the button, which is different from the movable lock restricting the flip cover in the prior art. Further, when the pressure and temperature of the liquid in the cup are too high, when the button is pressed, the flip cover is still in contact with the finger before opening, and a gap will be formed between the water outlet and the sealing ring to release the pressure. After the finger leaves the button, the pressure and high-temperature steam have been released, and the flip cover can be opened at normal speed to ensure the safety. The clamping points between the button and the water outlet are on two sides of the water outlet respectively. The clamping points are in two-point engagement to disperse the force.

Compared with the traditional bouncing type cover, it has stable performance and longer service life.

The thermos cup provided by the present application adopts the cup cover provided by the present application, which has all the beneficial effects of the cup cover provided by the present application.

Figure 1:
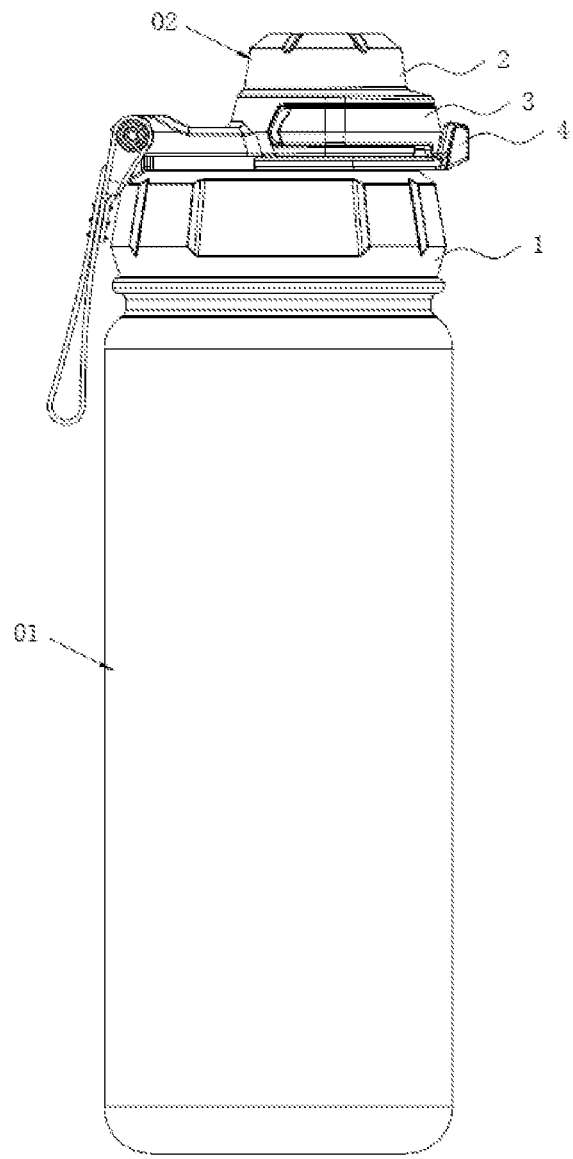
FIG. 1 illustrates a structural schematic diagram of a thermos cup according to embodiment 1 of the present application.

In the drawings, 01—cup body; 02—cup cover;
- 1—cover seat; 11—water outlet; 12—clamping block; 121—guide surface; 13—angle limiting part; 14—height limiting part;
- 2—flip cover; 21—hinging part; 22—sealing part; 23—sealing ring mounting column; 24—U-shaped groove; 25—first plane; 26—sliding groove; 27—spring mounting column;
- 3—button; 31—U-shaped part; 32—second plane; 33—sliding block; 34—butting plane; 35—anti-falling part; 36—lower convex part;
- 4—movable lock; 41—split ring part; 42—deformation groove; 43—blocking part; 44—toggle part;
- 5—elastic member;
- 6—first sealing ring;
- 7—second sealing ring

DESCRIPTION OF THE EMBODIMENTS

The technical solutions of the embodiments of the present application will be explained and described below in combination with the drawings of the embodiments of the present application, but the following embodiments are only the preferred embodiments of the present application, not all of them. According to the embodiments of the present application, other embodiments obtained by those skilled in the art without contributing any inventive labor still fall within the scope of protection of the present application.

Figure 2:
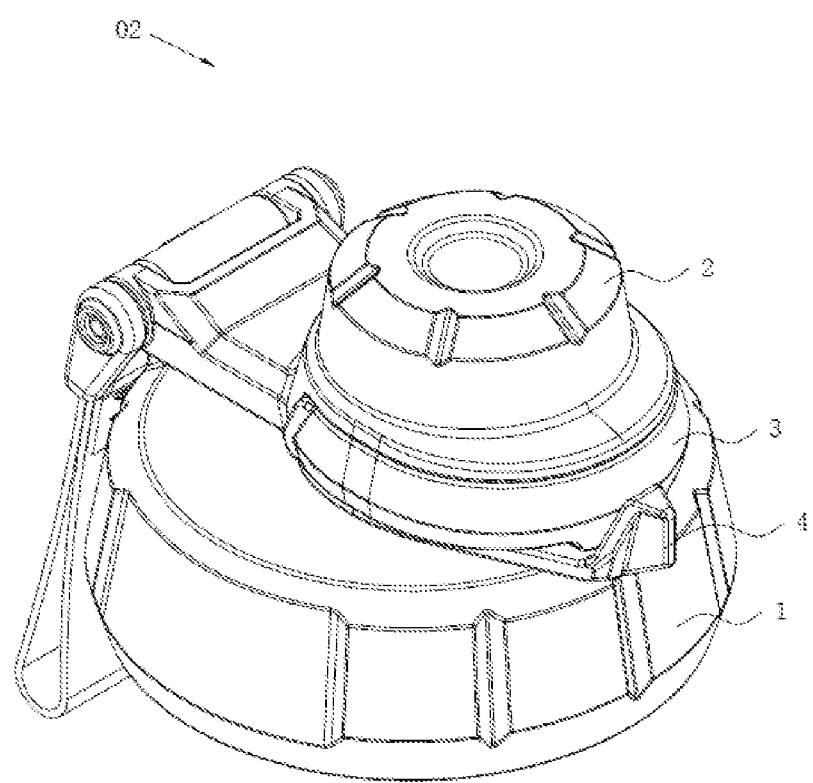
FIG. 2 illustrates a structural schematic diagram of a cup cover of the thermos cup according to embodiment 1 of the present application.
Figure 3:
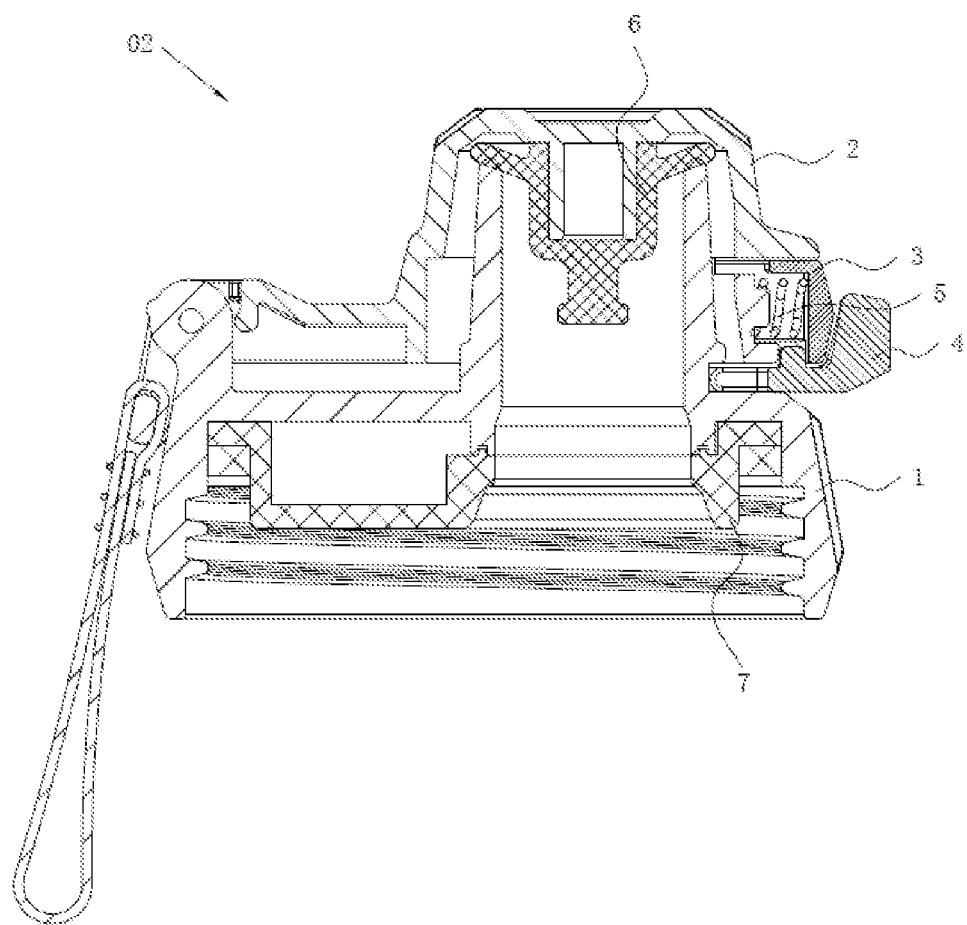
FIG. 3 illustrates a sectional view of the cup cover of the thermos cup according to embodiment 1 of the present application.
Figure 4:
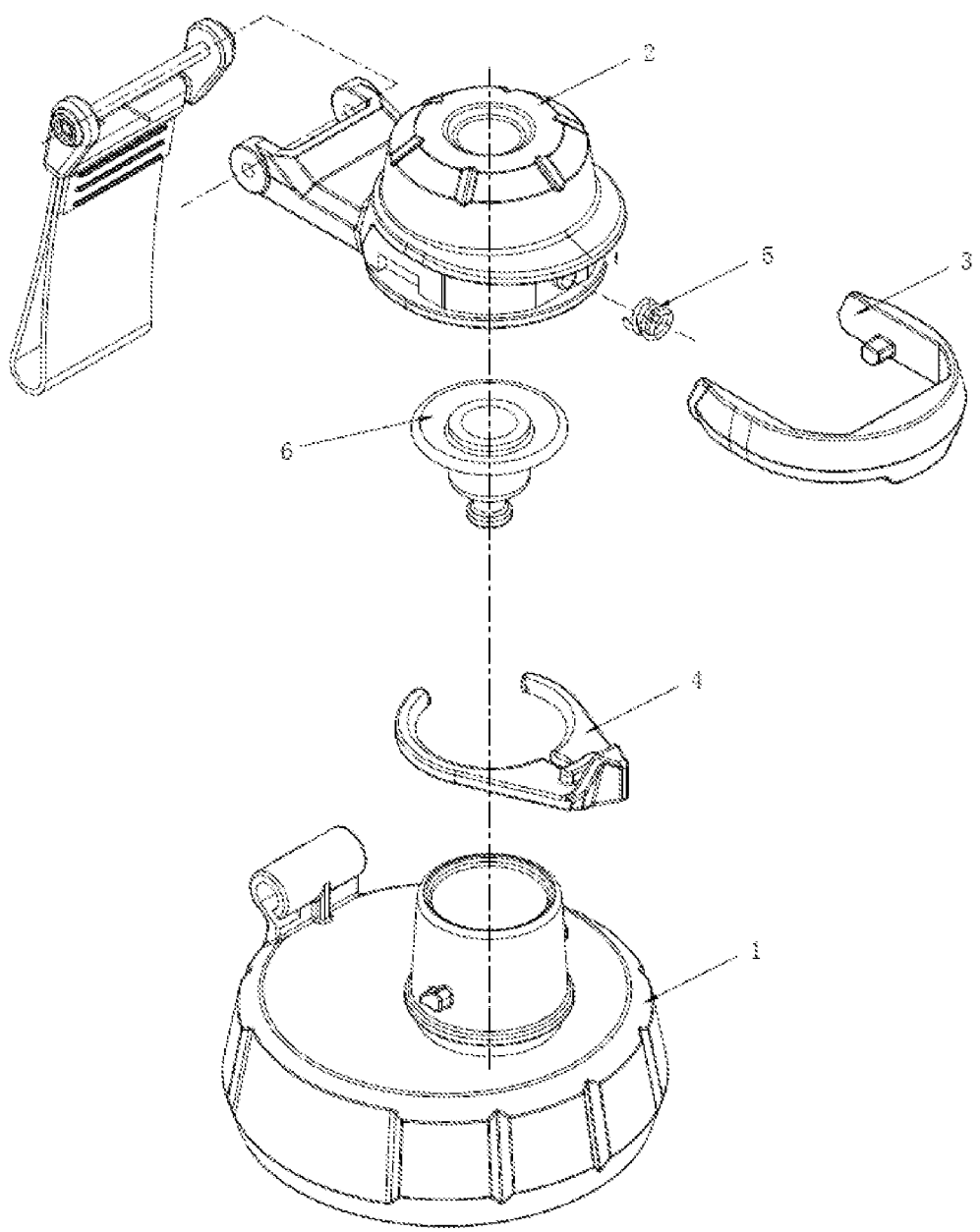
FIG. 4 illustrates a structural exploded diagram of the cup cover of the thermos cup according to embodiment 1 of the present application.
Figure 5:
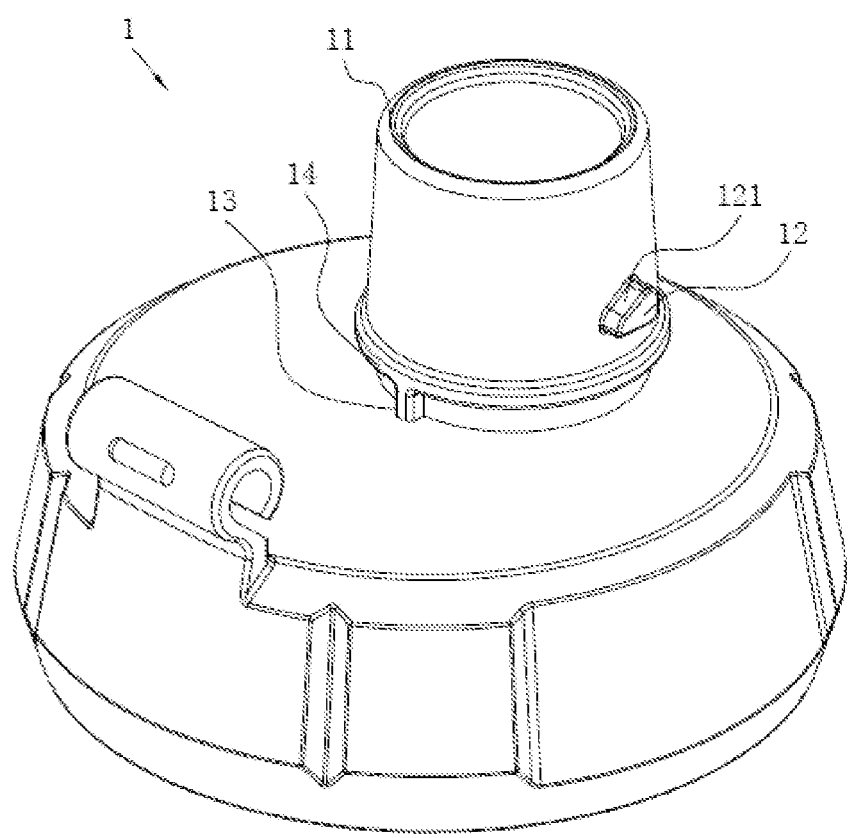
FIG. 5 illustrates a structural schematic diagram of a cover seat of the cup cover of the thermos cup according to embodiment 1 of the present application.
Figure 6:
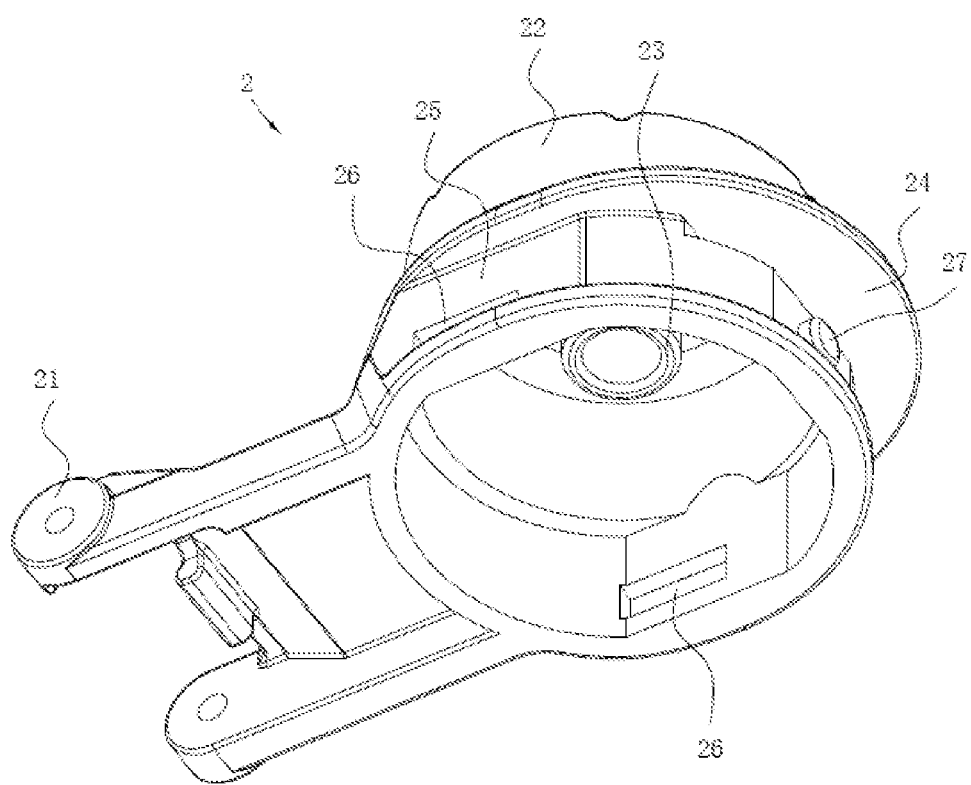
FIG. 6 illustrates a structural schematic diagram of a flip cover of the cup cover of the thermos cup according to embodiment 1 of the present application.
Figure 7:
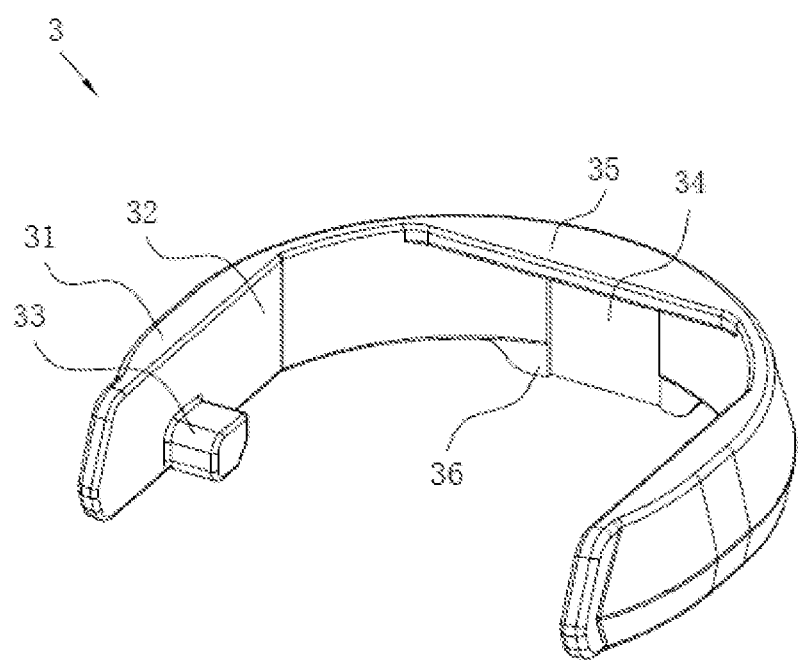
FIG. 7 illustrates a structural schematic diagram of a button of the cup cover of the thermos cup according to embodiment 1 of the present application.
Figure 8:
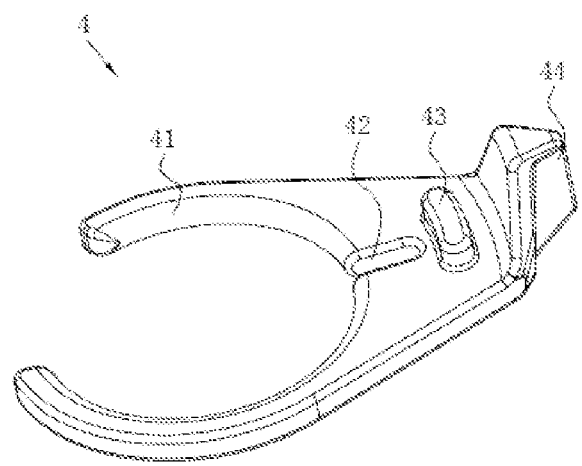
FIG. 8 illustrates a structural schematic diagram of a movable lock of the cup cover of the thermos cup according to embodiment 1 of the present application.

Referring to FIG. 1 to FIG. 8, the present application provides a thermos cup, which includes a cup body and a cup cover. The cup cover includes:

a cover seat, a water outlet being formed in the cover seat;

a flip cover assembly, the flip cover assembly including a flip cover hinged on the cover seat, a button provided on the flip cover and movable relative to the flip cover, and an elastic member acting on the button and making the button far away from the flip cover, the flip cover being capable of covering the water outlet, and a clamping structure being formed between the button and the water outlet; and a movable lock, the movable lock being movably provided on the cover seat, the movable lock moving between a locked position and an unlocked position, and the movable lock being provided with a blocking part;

when the movable lock is in the locked position, the blocking part of the movable lock is on a moving path of the button, and the blocking part prevents the button from moving; when the movable lock is in the unlocked position, the blocking part of the movable lock is outside the moving path of the button, the button overcomes the elastic force of the elastic member and moves towards the flip cover when the button is pressed, the button is separated from the water outlet, and the button flips with the flip cover.

The button of the cup cover provided by the present application flips with the flip cover and is not fixed, so it is not easy to touch the lip, does not affect the user's drinking, and will not bring potential health hazards caused by the contaminated button touching the lip. It is provided with a movable lock and the movable lock restricts the movement of the button, which is different from the movable lock restricting the flip cover in the prior art.

Embodiment 1

Referring to FIG. 1 to FIG. 8, embodiment 1 of the present application provides a thermos cup, which includes a cup body 01 and a cup cover 02. The cup cover 02 includes:

a cover seat 1, a water outlet 11 being formed in the cover seat 1;

a flip cover assembly, the flip cover assembly including a flip cover 2 hinged on the cover seat 1, a button 3 provided on the flip cover 2 and movable relative to the flip cover 2, and an elastic member 5 acting on the button 3 and making the button 3 far away from the flip cover, the flip cover 2 being capable of covering the water outlet 11, and a clamping structure being formed between the button 3 and the water outlet 11; and a movable lock 4, the movable lock 4 being movably provided on the cover seat 1, the movable lock 4 moving between a locked position and an unlocked position, and the movable lock 4 being provided with a blocking part 43;

when the movable lock 4 is in the locked position, the blocking part 43 of the movable lock 4 is on a moving path of the button 3, and the blocking part 43 prevents the button 3 from moving; when the movable lock 4 is in the unlocked position, the blocking part 43 of the movable lock 4 is outside the moving path of the button 3, the button 3 overcomes the elastic force of the elastic member 5 and moves towards the flip cover 2 when the button 3 is pressed, the button 3 is separated from the water outlet 11, and the button 3 flips with the flip cover 2.

In this embodiment, a U-shaped groove 24 is formed in the flip cover 2, and the shape of the button 3 is adapted to the U-shaped groove 24.

In this embodiment, the button 3 and the movable lock 4 in the locked position are in the front, and the hinging position of the flip cover 2 is in the rear.

In this embodiment, the button 3 moves back and forth between a clamped position and a non-clamped position by sliding back and forth horizontally.

In this embodiment, the movable lock 4 moves back and forth between the locked position and the unlocked position through horizontal rotation.

In this embodiment, the movable lock 4 includes a split ring part 41, the split ring part 41 sleeves the water outlet 11, and there is friction force between the split ring part 41 and the water outlet 11. The split ring part 41 of the movable lock 4 has certain elastic force. After the split ring part 41 is opened, it tightly sleeves the water outlet 11 to produce friction force with the water outlet 11, so that the split ring part 41 can stop at the locked position or unlocked position without external force, and will not move easily. The split ring part 41 directly sleeves the water outlet 11, so the structure is simpler.

In other embodiments, the cover seat 1 may additionally extend to form a mounting column or ring of the movable lock 4, but this makes the structure more complex.

In this embodiment, the central angle of the opening of the split ring part 41 of the movable lock 4 is less than 180° to prevent the movable lock 4 from falling off the water outlet 11. The central angle of the opening of the split ring part 41 is approximate to the maximum rotation angle of the movable lock 4 (because the angle limiting part 13 occupies a certain angle). Specifically, the central angle of the opening of the split ring part 41 of the movable lock 4 is preferably 60° to 120°. In this embodiment, the central angle of the opening of the split ring part 41 of the movable lock 4 is about 80°.

In this embodiment, the split ring part 41 is provided with a deformation groove 42 at a position adjacent to the blocking part 43. The deformation groove 42 makes the split ring part 41 of the movable lock 4 be opened more easily and makes the movable lock 4 more easily sleeve the water outlet 11. At the same time, by changing the deformation groove 42, the sleeving tightness between the split ring part 41 and the water outlet 11 can be adjusted, so that the friction force between the button 3 and the water outlet 11 is more appropriate.

In this embodiment, the front end of the split ring part 41 of the movable lock 4 extends outwards and upwards to form a toggle part 44. The user can rotate the movable lock 4 by touching the toggle part 44 with his fingers, thus making the operation of the movable lock 4 more convenient. The toggle part 44 is bilaterally symmetrical.

In this embodiment, an angle limiting part 13 and a height limiting part 14 for limiting the split ring part 41 are formed at the water outlet 11. The angle limiting part 13 restricts the horizontal rotation angle of the movable lock 4, and the height limiting part 14 restricts the displacement of the movable lock 4 in the height direction.

In this embodiment, the number of the angle limiting part 13 is one, and the height limiting part 14 is annular. The angle limiting part 13 is connected with the height limiting part 14.

In other embodiments, the number of the angle limiting part 13 may also be two.

In this embodiment, the flip cover 2 is provided with sliding grooves 26, the button 3 is provided with a slider 33, and the slider 33 is fit with the sliding grooves 26 to make the button 3 slide horizontally.

In this embodiment, an outer side of the water outlet 11 extends to form a pair of clamping blocks 12, the slider 33 is exposed to the sliding grooves 26, and the clamping blocks 12 are fit with the slider 33 and form the clamping structure. When the slider 33 is at least partially located directly below the clamping blocks 12, the clamping blocks 12 block the slider 33 and the slider 33 of the button 3 is clamped with the clamping blocks 12 of the cover seat 1.

In this embodiment, the pair of clamping blocks are provided respectively on the left and right.

In this embodiment, each clamping block 12 is provided with a guide surface 121 fit with the slider 33, and the guide surface 121 is high in front and low in back. When the flip cover 2 is closed, the clamping blocks 12 on the button 3 contact the slider 33. Since the slider 33 is provided with a guide surface 121, the button 3 is subject to the force from the slider 33, the elastic member 5 between the button 3 and the flip cover 2 is compressed, and the button 3 slides towards the flip cover 2, so that the slider 33 does not interfere with the clamping blocks 12 and the slider 33 can reach the lower part of the clamping blocks 12. When the slider 33 reaches the lower part of the clamping blocks 12, the slider 33 is no longer subject to the force from the clamping blocks 12. Under the action of the elastic member 5, the button 3 slides away from the flip cover 2, and the slider 33 of the button 3 is clamped with the clamping blocks 12 of the cover seat 1.

In this embodiment, the button 3 is provided with a U-shaped part 31U which can produce certain deformation to facilitate mounting to the flip cover 2.

In this embodiment, the button 3 is provided with two parallel first planes 2, and the slider 33 extends from the first planes 25 in opposite directions; the flip cover 2 is provided with two parallel second planes 32, and the sliding grooves 26 are provided in the second planes 32. The button 3 is in good contact with the flip cover 2 through the first planes 25 and the second planes 32, which can reduce the impurities entering the internal part from the sliding grooves 26.

In this embodiment, the elastic member 5 is a compression spring, a spring mounting column 27 is formed on the flip cover 2, the compression spring sleeves the spring mounting column 27, the button 3 is provided with a butting plane 34, one end of the compression spring is butted against the butting plane 34, and an upper end of the button 3 forms an anti-falling part 35 for preventing the compression spring from falling out.

In this embodiment, the flip cover 2 includes a hinging part 21 and a sealing part 22. A torsion spring is provided between the hinging part 21 and the cover seat 1, so that the flip cover 2 will open automatically after pressing the button 3. For the specific structures of the hinging part 21 and the torsion spring, a reference may be made to the prior art.

In this embodiment, the flip angle of the flip cover 2 is about 180°, so as to minimize the impact on user's drinking.

In this embodiment, the sealing part 22 of the flip cover 2 is in a cylindrical shape with an opening in the lower end, the inner side of the sealing part 22 extends downwards to form a sealing ring mounting column, and a first sealing ring 6 is provided in the sealing ring mounting column. When the flip cover 2 is tightly closed, the first sealing ring 6 is compressed, and the first sealing ring 6 is hermetically connected with the water outlet 11.

In this embodiment, the button 3 extends to form a lower convex part 36, and the lower convex part 36 is fit with the blocking part 43, so that the height of the blocking part 43 can be relatively small and the compression spring can be prevented from interfering with the blocking part 43.

In this embodiment, the cover seat 1 is provided with a handle.

In this embodiment, a second sealing ring 7 is provided between the cup body 01 and the cup cover 02. The cup body 01 is in threaded connection with the cup cover 02.

In this embodiment, the cup body 01 is a double-layer stainless steel structure, and the space between the outer stainless steel and the inner stainless steel is vacuumed.

In this embodiment, the cover seat 1 is provided with a base and the water outlet 11 extends upwards from the base. The split ring part 41 of the movable lock 4 is located between the flip cover 2 and the base of the cover seat 1, and the toggle part 44 of the movable lock 4 is located on the radial outer side of the button 3.

The working principle of the thermos cup according to this embodiment is as follows: in the locked state, the flip cover 2 and the button 3 cover the water outlet 11, and the movable lock 4 is in the locked position. At this time, the slider 33 of the button 3 is at least partially located directly below the clamping blocks 12 at the water outlet 11, the slider 33 is butted against the clamping blocks 12, the first sealing ring 6 on the flip cover 2 is compressed, the first sealing ring 6 seals the water outlet 11, and the blocking part 43 of the movable lock 4 is located on the sliding path of the lower convex part 36 of the button 3. At this time, even if the button 3 is pressed by mistake, the blocking part 43 of the movable lock 4 will prevent the lower convex part 36 of the button 3 from sliding towards the flip cover 2, so that the slider 33 is kept directly below the clamping blocks 12, and the flip cover 2, the button 3 and the first sealing ring 6 will not rotate. When water is needed, the movable lock 4 is toggled to make the movable lock 4 rotate. When the movable lock 4 rotates by a certain angle (usually when the split ring part 41 of the movable lock 4 is butted against the angle limiting part 13), the blocking part 43 of the movable lock 4 is outside the sliding path of the lower convex part 36 of the button 3, and the movable lock 4 will not hinder the sliding of the button 3. At this time, by pressing the button 3, the button 3 overcomes the acting force of the compression spring and slides to the flip cover 2. When sliding for a certain distance, the slider 33 of the button 3 slides directly below the clamping blocks 12 at the water outlet 11, and the slider 33 is no longer blocked by the clamping blocks 12. At this time, by loosening the fingers, the flip cover 2, the button 3 and the first sealing ring 6 rotate under the action of the torsion spring for opening. After drinking, the flip cover 2 is closed, and the button 3 rotates with the flip cover 2. When it rotates to a certain angle, the slider 33 of the button 3 is butted against the guide surfaces 121 of the clamping blocks 12 at the water outlet 11, the button 3 is subjected to the reaction force from the clamping blocks 12, the compression spring is compressed, and the button 3 slides along the sliding grooves 26 to the flip cover 2. When the button 3 slides out of the guide surfaces 121 to the lower part of the clamping blocks 12, the button 3 is no longer subject to the reaction force from the clamping blocks 12, The button 3 slides away from the flip cover 2 along the sliding grooves 26 under the action of the compression spring. At this time, the first sealing ring 6 is compressed to seal the water outlet 11. After the button 3 is clamped with the cover seat 1, the movable lock 4 is toggled to rotate the blocking part 43 of the movable lock 4 to the lower convex part 36 of the button 3, thus realizing the locking.

In this embodiment, when the button 3 is pressed with normal force, the button 3 is still in contact with the finger before rotation. At this time, the flip cover 2, the button 3 and the first sealing ring 6 will rotate slightly, a small gap will be formed between the water outlet 11 and the first sealing ring 6, the sealing part 22 will fail, and the pressure will be released. After the finger leaves the button 3, the pressure and high-temperature steam have been basically released, and the flip cover 2 will be opened at normal speed to ensure safety. Compared with the prior art in which the flip cover 2 is immediately opened after the button 3 is pressed, the thermos cup according to this embodiment will have exhaust time after the button 3 is pressed. During the exhaust time, because the finger still presses the button 3, the flip cover 2 and the first sealing ring 6 rotating together with the button 3 will not be opened.

The cup cover according to embodiment 1 of the present application has the following beneficial effects: the button 3 flips with the flip cover 2 to the rear of the thermos cup and is not fixed at the front of the thermos cup, so the button 3 is not easy to touch the lip during drinking, does not affect the user's drinking, and will not bring potential health hazards caused by the contaminated button 3 touching the lip. It is provided with a movable lock 4, the flip cover 2 will not be opened even though the button 3 is touched by mistake, and the movable lock 4 restricts the sliding of the button 3, which is different from the movable lock 4 restricting the flip cover 2 in the prior art. When the pressure and temperature of the liquid in the cup are too high, when the button 3 is pressed, a gap will be formed between the water outlet 11 and the first sealing ring 6 to release the pressure. After the finger leaves the button 3, the pressure and high-temperature steam have been released, and the flip cover 2 can be opened at normal speed to ensure the safety. The clamping points between the button 3 and the water outlet 11 are on two sides of the water outlet 11 respectively. The clamping points are in two-point engagement to disperse the force. Compared with the traditional bouncing type cover which realizes clamping fit by one point, it has stable performance and longer service life.

What are described above are only the specific embodiments of the present application, but the scope of protection of the present application is not limited thereto. Those skilled in the art should understand that the present application includes but is not limited to the content described in the specific embodiments. Any modification that does not deviate from the function and structural principle of the present application should be included in the scope of the claims.

The invention claimed is:

1. A cup cover, wherein the cup cover comprises:
a cover seat, a water outlet being formed in the cover seat;
a flip cover assembly, the flip cover assembly comprising a flip cover hinged on the cover seat, a button provided on the flip cover and movable relative to the flip cover, and an elastic member acting on the button and making the button away from the flip cover, the flip cover being capable of covering the water outlet, and a clamping structure being formed between the button and the water outlet; and
a movable lock, the movable lock being movably provided on the cover seat, the movable lock moving between a locked position and an unlocked position, and the movable lock being provided with a blocking part;
when the movable lock is in the locked position, the blocking part of the movable lock is on a moving path of the button, and the blocking part prevents the button from moving; when the movable lock is in the unlocked position, the blocking part of the movable lock is outside the moving path of the button, the button overcomes an elastic force of the elastic member and moves towards the flip cover when the button is pressed, the button is separated from the water outlet, and the button flips with the flip cover,
wherein the movable lock moves back and forth between the locked position and the unlocked position through horizontal rotation, and
wherein the movable lock comprises a split ring part, the split ring part sleeves the water outlet, and there is friction force between the split ring part and the water outlet.

2. The cup cover according to claim 1, wherein the split ring part is provided with a deformation groove at a position adjacent to the blocking part; the movable lock extends outwards to form a toggle part; an angle limiting part and a height limiting part for limiting the split ring part are formed at the water outlet.

3. The cup cover according to claim 1, wherein the flip cover is provided with sliding grooves, the button is provided with a slider and the slider is fit-fits with the sliding grooves.

4. The cup cover according to claim 3, wherein an outer side of the water outlet extends to form a pair of clamping blocks, the slider is exposed to the sliding grooves, the clamping blocks fit with the slider and form the clamping structure, each clamping block is provided with a guide surface fit with the slider, and the guide surface is high in front and low in back.

5. The cup cover according to claim 3, wherein the button is provided with a U-shaped part, the button is provided with two parallel first planes, and the slider extends from the first planes in opposite directions; the flip cover is provided with two parallel second planes, and the sliding grooves are provided in the second planes.

6. The cup cover according to claim 1, wherein the elastic member is a compression spring, a spring mounting column is formed on the flip cover, the compression spring sleeves the spring mounting column, the button is provided with a butting plane, one end of the compression spring is butted against the butting plane, and an upper end of the button forms an anti-falling part for preventing the compression spring from falling out.

7. The cup cover according to claim 1, wherein a torsion spring is provided between the flip cover and the cover seat; the flip cover is provided with a first sealing ring; when the flip cover is tightly closed, the first sealing ring is hermetically connected with the water outlet; the button extends to form a lower convex part, and the lower convex part [is] fit with the blocking part; a U-shaped groove is formed in the flip cover, and a shape of the button is adapted to the U-shaped groove.

* * * * *